F. P. DEEVER.
NUT LOCK.
APPLICATION FILED JUNE 10, 1918.
1,336,733.  Patented Apr. 13, 1920.
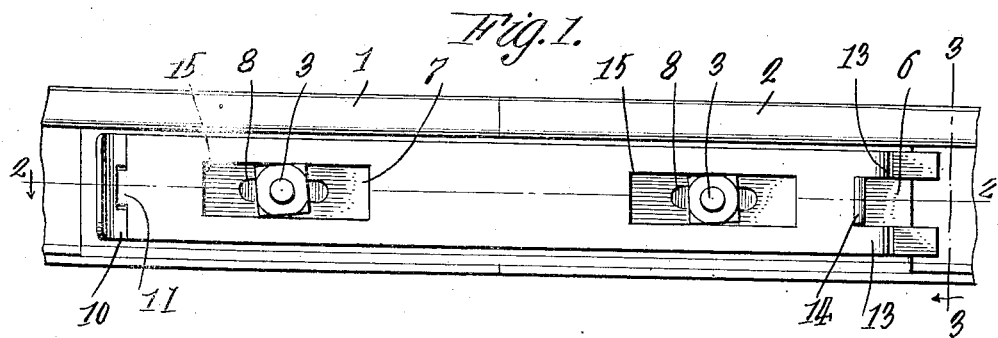
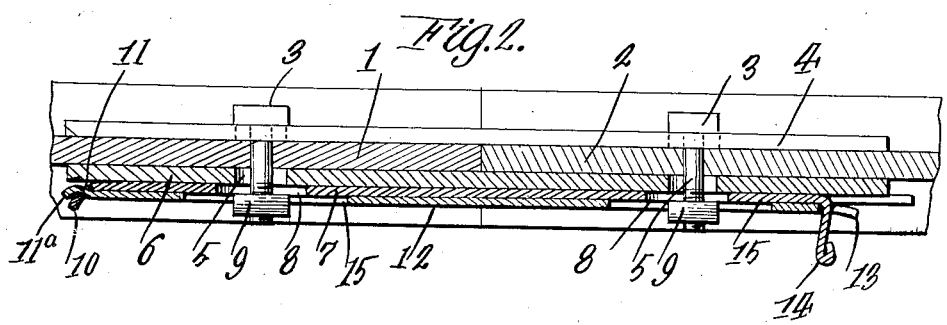
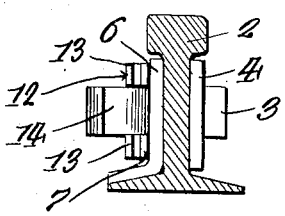
INVENTOR
Frederick P. Deever
WITNESSES
BY
ATTORNEY

UNITED STATES PATENT OFFICE.

FREDERICK P. DEEVER, OF MANNINGTON, WEST VIRGINIA, ASSIGNOR OF ONE-HALF TO ANGUS B. COOPER, OF MANNINGTON, WEST VIRGINIA.

NUT-LOCK.

1,336,733. Specification of Letters Patent. Patented Apr. 13, 1920.

Application filed June 10, 1918. Serial No. 239,214.

*To all whom it may concern:*

Be it known that I, FREDERICK P. DEEVER, a citizen of the United States, residing at Mannington, in the county of Marion and State of West Virginia, have invented certain new and useful Improvements in Nut-Locks, of which the following is a specification.

This invention relates to nut locks, and more particularly to a nut lock which is especially adapted for use in connection with rail joints.

One of the main objects of the invention is to provide a nut lock of the character stated of simple construction and operation, which may be readily applied to a rail joint of standard construction. A further object is to provide a nut lock provided with a locking plate adapted to engage about the nuts of the bolts so as to secure the same against rotation, this plate being readily detachable so as to permit easy removal thereof. Another object is to provide a base plate which may be readily applied to the fixed plate of the rail joint and which serves to detachably support the locking plate. Further objects will appear from the detailed description.

In the drawings:

Figure 1 is a side view of a nut lock constructed in accordance with my invention as applied, Fig. 2 is a section taken substantially on line 2—2 of Fig. 1, Fig. 3 is a section taken substantially on line 3—3 of Fig. 1.

My invention is illustrated as applied to a rail joint of standard construction in which the adjacent end portions of the rails 1 and 2 are secured together by bolts 3 which are inserted through openings provided in the inner fish plate 4 for this purpose, these bolts extending through slots 5 provided in the outer fish plate 6 so as to permit expansion and contraction of the rails to accommodate variations in temperature.

A base plate 7 is mounted on the outer face of the outer fish plate 6 and is provided with slots 8 which accommodate the bolts 5 so as not to interfere with the expansion and contraction of the rails, this plate being secured in position by the nuts 9 which are threaded on the bolts, the slots 8 being of less width than the nuts. One end of base plate 7 is turned outwardly and provided with a central transverse slot to form an angularly disposed eye 10 which is adapted to receive the inwardly directed angularly disposed locking tongue 11 provided at one end of the locking plate 12, the outer end portion 11ª of this tongue being arched outwardly slightly so as to engage the outer edge of eye 10 and lock the plate 12 against longitudinal movement when the plate is in operative position, as in Fig. 2. The other end of locking plate 12 is provided with a substantially rectangular recess which provides the spaced parallel outwardly projecting tabs 13 between which snugly engages the outwardly, projecting spring locking finger 14 formed integral with base plate 7, this locking finger being formed by providing the base plate with two parallel slits extending inwardly from the end thereof and bending the material between the slits outwardly. As will be noted more clearly from Fig. 2, the locking finger 14 is disposed at an acute angle to the body of the plate so that this finger engages over the end of locking plate 12 between the tabs 13 so as to normally secure this plate against outward movement away from the base plate while permitting this plate to be moved outwardly by inserting a suitable instrument beneath the tabs 13 which are slightly arched outwardly for this purpose. Locking plate 12 is provided with two longitudinally extending slots 15 which are so spaced as to engage about the nuts 9, these slots being of somewhat greater width than the nuts so that, when the nuts have been turned to such position as to have their lateral faces slightly inclined, the uppermost and lowermost corners of the nuts will engage the plate at the upper and lower edges, respectively, of the slots 15 so as to be tightly gripped frictionally thereby. The plate will thus act to positively prevent reverse rotation of the nuts, the nuts and plate also acting to frictionally secure the plate in position and providing a securing means for this locking plate supplemental to the spring locking finger 14. When it is desired to release the lock, nuts 9 are turned slightly in a right hand or clockwise direction so as to disengage the corners thereof from the plate, thus permitting the locking plate to be readily removed by insertion of any suitable instrument beneath the tabs 13, the plate being forced outwardly out of engagement with locking finger 14 and from about the nuts 9, after which the tongue 11 may be readily disengaged from eye 10. When this has been done, the nuts may be removed from the bolts so as to permit the joint to be readily disassembled. To apply the lock this operation is reversed.

The foregoing description and the drawings have reference to what may be considered the preferred, or approved form of my invention. It is to be understood however, that I may make such changes in construction, and arrangement, and combination of parts, materials, dimensions, et cetera, as may prove expedient and fall within the scope of the appended claim.

Having thus fully described my invention, what I claim as new and desire to secure by Letters Patent is:—

In a nut locking device, for use in connection with the fish plates and the nuts and bolts of a rail joint, a base plate set against one of the fish plates and provided with openings of sufficient diameter to accommodate the shanks of the bolts of the rail joint and permitting the expansion or contraction of the rail joint without injurious effect to the locking device, said plate being further formed at one end with an outturned eyepiece and at the other end with a number of resilient tabs, one of which is struck outwardly from the others to form a locking member, a locking plate fitted against said base plate, one end thereof being slidable through the eyepiece of the base plate and the other end being notched for engagement under the locking tab of the base plate, said plate having spaced openings formed therein for receiving and retaining in locked position, when partially rotated, the nuts carried by the bolts of said rail joint.

In testimony whereof I affix my signature in presence of two witnesses.

FREDERICK P. DEEVER.

Witnesses:
G. S. FURBEE.
J. E. FURBEE.